United States Patent [19]
Bernard et al.

[11] Patent Number: 5,008,746
[45] Date of Patent: Apr. 16, 1991

[54] HIGH DEFINITION TELEVISION SIGNAL PROCESSING INCLUDING SUBSAMPLING AND MOTION COMPENSATION

[75] Inventors: Philippe Bernard; Marie-Jean Colaitis, both of Cesson Sevigne Cedex, France

[73] Assignee: Centre National d'Etudes des Telecommunications, Paris, France

[21] Appl. No.: 366,884

[22] Filed: Jun. 16, 1989

[30] Foreign Application Priority Data

Jun. 16, 1988 [FR] France ................. 88 08096

[51] Int. Cl.⁵ ............................. A04N 7/12
[52] U.S. Cl. ..................... 358/133; 358/105; 358/138; 358/140
[58] Field of Search ............ 358/138, 105, 140, 12, 358/13, 141, 133, 135, 136

[56] References Cited
U.S. PATENT DOCUMENTS

| | | | |
|---|---|---|---|
| 4,551,753 | 11/1985 | Nishizawa et al. | 358/138 X |
| 4,743,965 | 5/1988 | Yamada et al. | 358/138 X |
| 4,745,458 | 5/1988 | Hirano et al. | 358/105 X |

Primary Examiner—Victor R. Kostak
Attorney, Agent, or Firm—Fleit, Jacobson, Cohn, Price, Holman & Stern

[57] ABSTRACT

A method and installation are provided for broadcasting high definition television programs, particularly for broadcasting HD-MAC programs on a narrow channel, while reducing degradation of the picture when received by a first generation MAC receiver. The signal obtained by analysis of the source picture is subjected to spatio-temporal subsampling and to non-linear motion compensation filtering, leading to transmitting the points representative of the same source frame over at least two successive transmission frames (t1, t2) and transmitting, at the same time, assistance data defining a motion vector field. To improve the compatible frame delivered by a first generation receiver, the second analysis field corresponding to the same source frame is subjected to time attenuation in the direction of motion. Such attenuation depends on the movement vector and leads to assigning to each point of said parts an intermediate position between its position in the analyzed source frame and its anticipated position in the direction of movement.

9 Claims, 12 Drawing Sheets

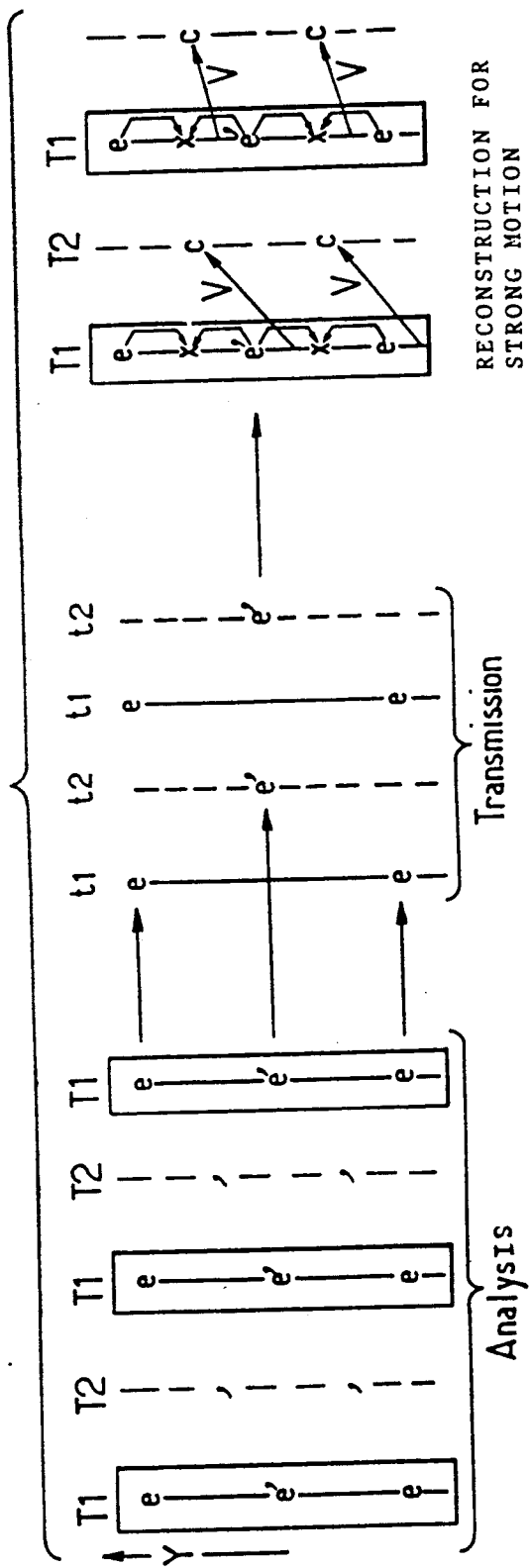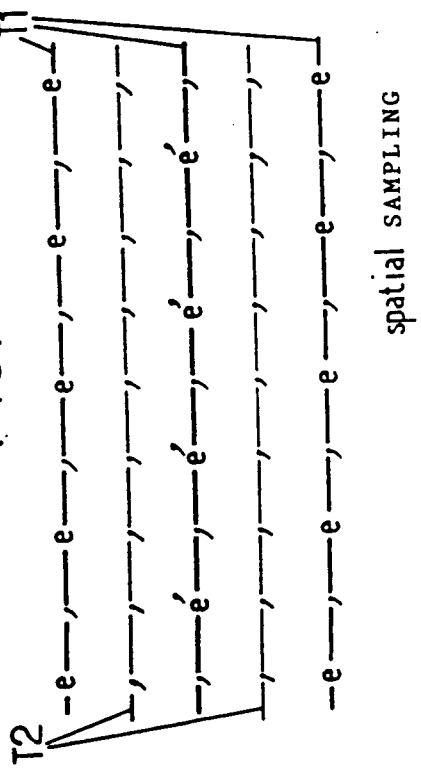

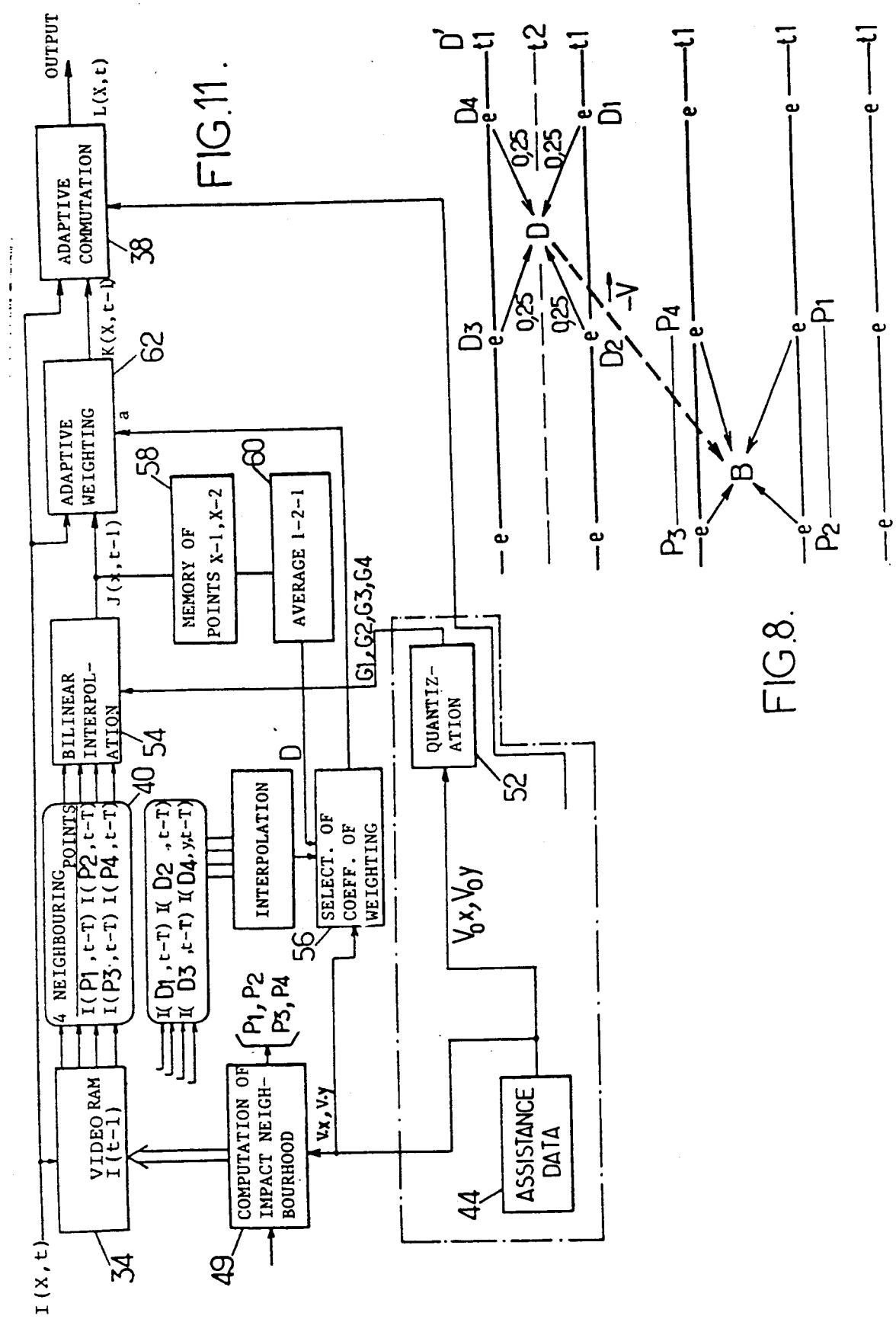

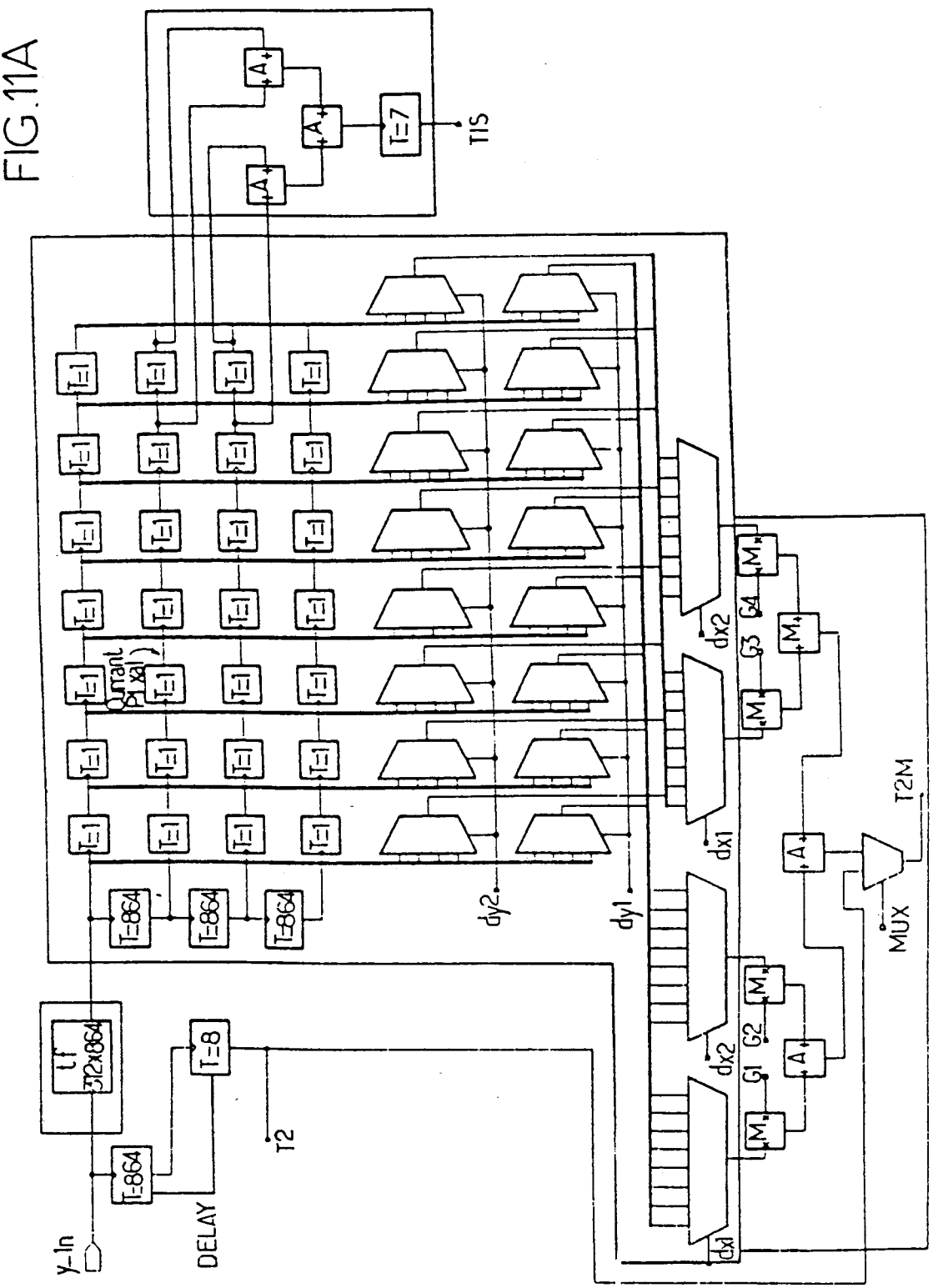

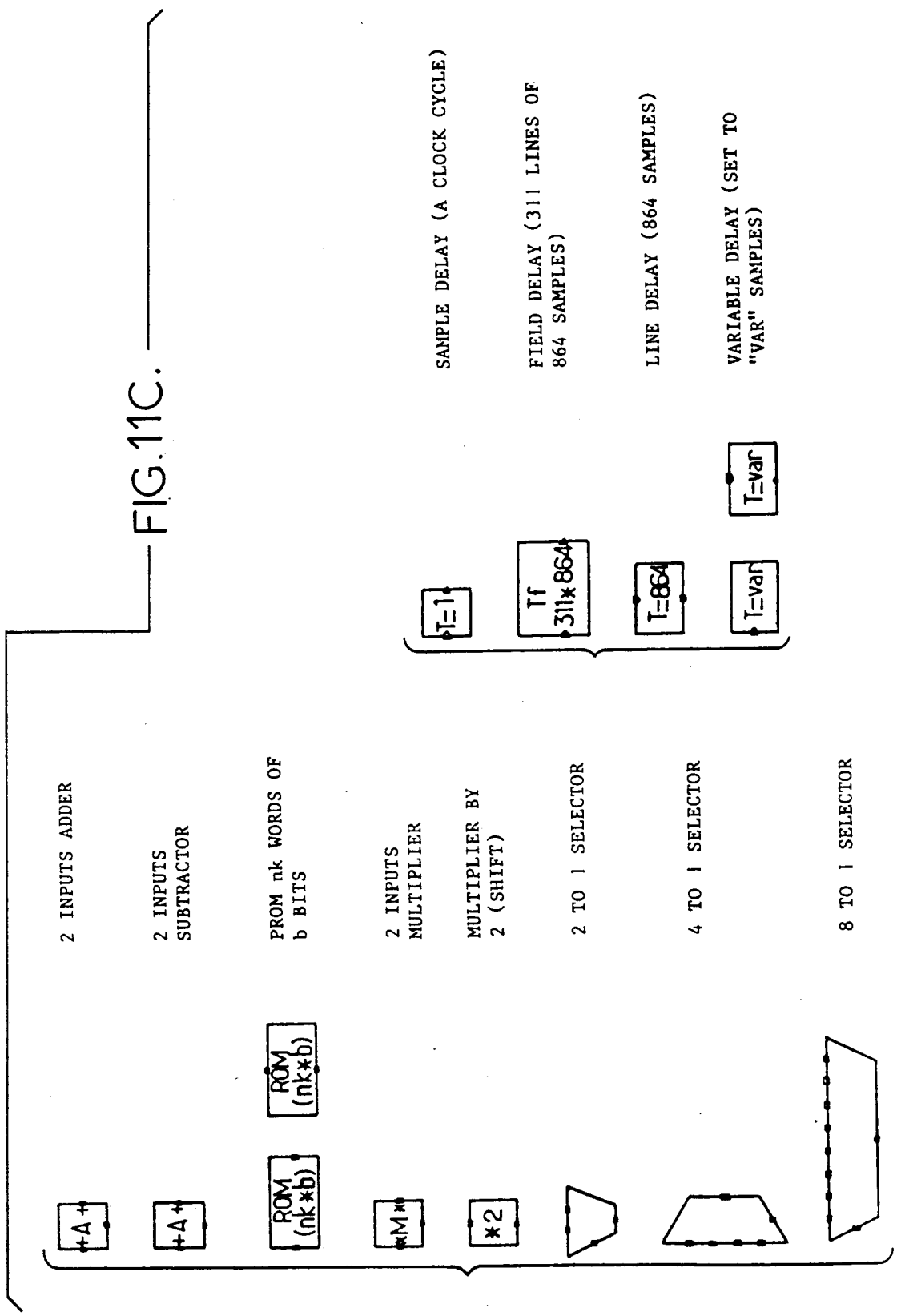

| Vy \ Vx : | -6 | -5 | -4 | -3 | -2 | -1 | 0 | 1 | 2 | 3 | 4 | 5 | 6 |
|---|---|---|---|---|---|---|---|---|---|---|---|---|---|
| -6 : | 1/2 | 0 | 1/2 | 0 | 1/2 | 0 | 1/2 | 0 | 1/2 | 0 | 1/2 | 0 | 1/2 |
| -5 : | 1/8 | 0 | 1/8 | 0 | 1/8 | 0 | 1/8 | 0 | 1/8 | 0 | 1/8 | 0 | 1/8 |
| -4 : | 1/4 | 0 | 1/4 | 0 | 1/4 | 0 | 1/4 | 0 | 1/4 | 0 | 1/4 | 0 | 1/4 |
| -3 : | 3/8 | 0 | 3/8 | 0 | 3/8 | 0 | 3/8 | 0 | 3/8 | 0 | 3/8 | 0 | 3/8 |
| -2 : | 1/2 | 0 | 1/2 | 0 | 1/2 | 0 | 1/2 | 0 | 1/2 | 0 | 1/2 | 0 | 1/2 |
| -1 : | 1/8 | 0 | 1/8 | 0 | 1/8 | 0 | 1/8 | 0 | 1/8 | 0 | 1/8 | 0 | 1/8 |
| 0 : | 1/4 | 0 | 1/4 | 0 | 1/4 | 0 | 1/4 | 0 | 1/4 | 0 | 1/4 | 0 | 1/4 |
| +1 : | 3/8 | 0 | 3/8 | 0 | 3/8 | 0 | 3/8 | 0 | 3/8 | 0 | 3/8 | 0 | 3/8 |
| +2 : | 1/2 | 0 | 1/2 | 0 | 1/2 | 0 | 1/2 | 0 | 1/2 | 0 | 1/2 | 0 | 1/2 |
| +3 : | 1/8 | 0 | 1/8 | 0 | 1/8 | 0 | 1/8 | 0 | 1/8 | 0 | 1/8 | 0 | 1/8 |
| +4 : | 1/4 | 0 | 1/4 | 0 | 1/4 | 0 | 1/4 | 0 | 1/4 | 0 | 1/4 | 0 | 1/4 |
| +5 : | 3/8 | 0 | 3/8 | 0 | 3/8 | 0 | 3/8 | 0 | 3/8 | 0 | 3/8 | 0 | 3/8 |
| +6 : | 1/2 | 0 | 1/2 | 0 | 1/2 | 0 | 1/2 | 0 | 1/2 | 0 | 1/2 | 0 | 1/2 |

G2

| Vy \ Vx : | -6 | -5 | -4 | -3 | -2 | -1 | 0 | 1 | 2 | 3 | 4 | 5 | 6 |
|---|---|---|---|---|---|---|---|---|---|---|---|---|---|
| -6 : | 1/2 | 1 | 1/2 | 1 | 1/2 | 1 | 1/2 | 1 | 1/2 | 1 | 1/2 | 1 | 1/2 |
| -5 : | 1/8 | 1/4 | 1/8 | 1/4 | 1/8 | 1/4 | 1/8 | 1/4 | 1/8 | 1/4 | 1/8 | 1/4 | 1/8 |
| -4 : | 1/4 | 1/2 | 1/4 | 1/2 | 1/4 | 1/2 | 1/4 | 1/2 | 1/4 | 1/2 | 1/4 | 1/2 | 1/4 |
| -3 : | 3/8 | 3/4 | 3/8 | 3/4 | 3/8 | 3/4 | 3/8 | 3/4 | 3/8 | 3/4 | 3/8 | 3/4 | 3/8 |
| -2 : | 1/2 | 1 | 1/2 | 1 | 1/2 | 1 | 1/2 | 1 | 1/2 | 1 | 1/2 | 1 | 1/2 |
| -1 : | 1/8 | 1/4 | 1/8 | 1/4 | 1/8 | 1/4 | 1/8 | 1/4 | 1/8 | 1/4 | 1/8 | 1/4 | 1/8 |
| 0 : | 1/4 | 1/2 | 1/4 | 1/2 | 1/4 | 1/2 | 1/4 | 1/2 | 1/4 | 1/2 | 1/4 | 1/2 | 1/4 |
| +1 : | 3/8 | 3/4 | 3/8 | 3/4 | 3/8 | 3/4 | 3/8 | 3/4 | 3/8 | 3/4 | 3/8 | 3/4 | 3/8 |
| +2 : | 1/2 | 1 | 1/2 | 1 | 1/2 | 1 | 1/2 | 1 | 1/2 | 1 | 1/2 | 1 | 1/2 |
| +3 : | 1/8 | 1/4 | 1/8 | 1/4 | 1/8 | 1/4 | 1/8 | 1/4 | 1/8 | 1/4 | 1/8 | 1/4 | 1/8 |
| +4 : | 1/4 | 1/2 | 1/4 | 1/2 | 1/4 | 1/2 | 1/4 | 1/2 | 1/4 | 1/2 | 1/4 | 1/2 | 1/4 |
| +5 : | 3/8 | 3/4 | 3/8 | 3/4 | 3/8 | 3/4 | 3/8 | 3/4 | 3/8 | 3/4 | 3/8 | 3/4 | 3/8 |
| +6 : | 1/2 | 1 | 1/2 | 1 | 1/2 | 1 | 1/2 | 1 | 1/2 | 1 | 1/2 | 1 | 1/2 |

$$8 * G1 = ((Vx + 1) \bmod 2) * ((Vy + 1) \bmod 4 + 1)$$
$$8 * G2 : (1 + (Vx \bmod 2)) * ((Vy + 1) \bmod 4 + 1)$$

FIG.14.

| G3 Vy \ Vx : | -6 | -5 | -4 | -3 | -2 | -1 | 0 | 1 | 2 | 3 | 4 | 5 | 6 |
|---|---|---|---|---|---|---|---|---|---|---|---|---|---|
| -6 : | 0 | 0 | 0 | 0 | 0 | 0 | 0 | 0 | 0 | 0 | 0 | 0 | 0 |
| -5 : | 3/8 | 0 | 3/8 | 0 | 3/8 | 0 | 3/8 | 0 | 3/8 | 0 | 3/8 | 0 | 3/8 |
| -4 : | 1/4 | 0 | 1/4 | 0 | 1/4 | 0 | 1/4 | 0 | 1/4 | 0 | 1/4 | 0 | 1/4 |
| -3 : | 1/8 | 0 | 1/8 | 0 | 1/8 | 0 | 1/8 | 0 | 1/8 | 0 | 1/8 | 0 | 1/8 |
| -2 : | 0 | 0 | 0 | 0 | 0 | 0 | 0 | 0 | 0 | 0 | 0 | 0 | 0 |
| -1 : | 3/8 | 0 | 3/8 | 0 | 3/8 | 0 | 3/8 | 0 | 3/8 | 0 | 3/8 | 0 | 3/8 |
| 0 : | 1/4 | 0 | 1/4 | 0 | 1/4 | 0 | 1/4 | 0 | 1/4 | 0 | 1/4 | 0 | 1/4 |
| +1 : | 1/8 | 0 | 1/8 | 0 | 1/8 | 0 | 1/8 | 0 | 1/8 | 0 | 1/8 | 0 | 1/8 |
| +2 : | 0 | 0 | 0 | 0 | 0 | 0 | 0 | 0 | 0 | 0 | 0 | 0 | 0 |
| +3 : | 3/8 | 0 | 3/8 | 0 | 3/8 | 0 | 3/8 | 0 | 3/8 | 0 | 3/8 | 0 | 3/8 |
| +4 : | 1/4 | 0 | 1/4 | 0 | 1/4 | 0 | 1/4 | 0 | 1/4 | 0 | 1/4 | 0 | 1/4 |
| +5 : | 1/8 | 0 | 1/8 | 0 | 1/8 | 0 | 1/8 | 0 | 1/8 | 0 | 1/8 | 0 | 1/8 |
| +6 : | 0 | 0 | 0 | 0 | 0 | 0 | 0 | 0 | 0 | 0 | 0 | 0 | 0 |

| G4 Vy \ Vx : | -6 | -5 | -4 | -3 | -2 | -1 | 0 | 1 | 2 | 3 | 4 | 5 | 6 |
|---|---|---|---|---|---|---|---|---|---|---|---|---|---|
| -6 : | 0 | 0 | 0 | 0 | 0 | 0 | 0 | 0 | 0 | 0 | 0 | 0 | 0 |
| -5 : | 3/8 | 3/4 | 3/8 | 3/4 | 3/8 | 3/4 | 3/8 | 3/4 | 3/8 | 3/4 | 3/8 | 3/4 | 3/8 |
| -4 : | 1/4 | 1/2 | 1/4 | 1/2 | 1/4 | 1/2 | 1/4 | 1/2 | 1/4 | 1/2 | 1/4 | 1/2 | 1/4 |
| -3 : | 1/8 | 1/4 | 1/8 | 1/4 | 1/8 | 1/4 | 1/8 | 1/4 | 1/8 | 1/4 | 1/8 | 1/4 | 1/8 |
| -2 : | 0 | 0 | 0 | 0 | 0 | 0 | 0 | 0 | 0 | 0 | 0 | 0 | 0 |
| -1 : | 3/8 | 3/4 | 3/8 | 3/4 | 3/8 | 3/4 | 3/8 | 3/4 | 3/8 | 3/4 | 3/8 | 3/4 | 3/8 |
| 0 : | 1/4 | 1/2 | 1/4 | 1/2 | 1/4 | 1/2 | 1/4 | 1/2 | 1/4 | 1/2 | 1/4 | 1/2 | 1/4 |
| +1 : | 1/8 | 1/4 | 1/8 | 1/4 | 1/8 | 1/4 | 1/8 | 1/4 | 1/8 | 1/4 | 1/8 | 1/4 | 1/8 |
| +2 : | 0 | 0 | 0 | 0 | 0 | 0 | 0 | 0 | 0 | 0 | 0 | 0 | 0 |
| +3 : | 3/8 | 3/4 | 3/8 | 3/4 | 3/8 | 3/4 | 3/8 | 3/4 | 3/8 | 3/4 | 3/8 | 3/4 | 3/8 |
| +4 : | 1/4 | 1/2 | 1/4 | 1/2 | 1/4 | 1/2 | 1/4 | 1/2 | 1/4 | 1/2 | 1/4 | 1/2 | 1/4 |
| +5 : | 1/8 | 1/4 | 1/8 | 1/4 | 1/8 | 1/4 | 1/8 | 1/4 | 1/8 | 1/4 | 1/8 | 1/4 | 1/8 |
| +6 : | 0 | 0 | 0 | 0 | 0 | 0 | 0 | 0 | 0 | 0 | 0 | 0 | 0 |

$$8 * G3 = (Vx + 1) \text{ modulo } 2) * (3 - (Vy + 1) \text{ modulo } 4)$$
$$8 * G4 = (1 + (Vx \text{ modulo } 2)) * (3 - (Vy + 1) \text{ modulo } 4)$$

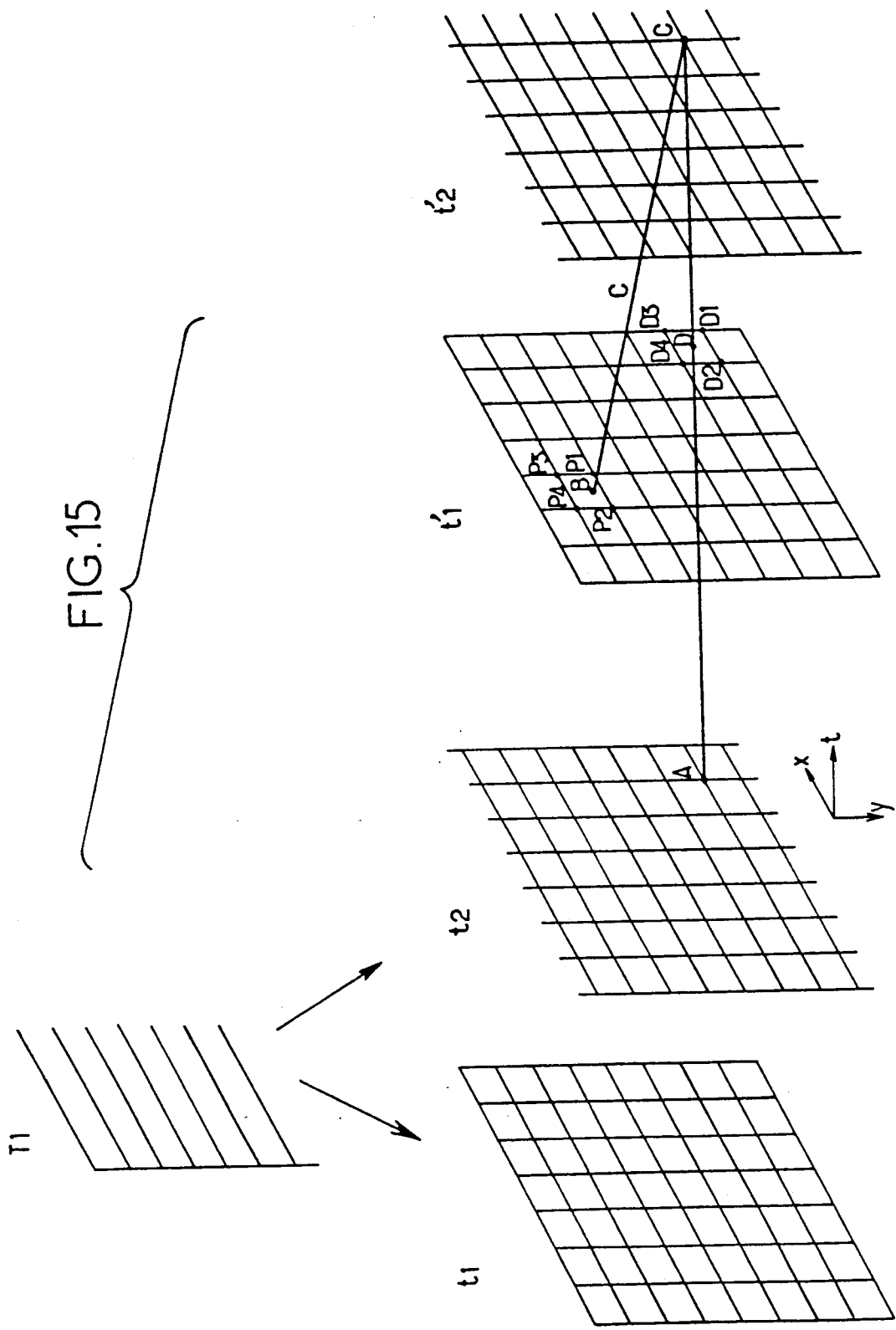

HIGH DEFINITION TELEVISION SIGNAL PROCESSING INCLUDING SUBSAMPLING AND MOTION COMPENSATION

BACKGROUND OF THE INVENTION

1. Technical Field

The invention relates to broadcasting of television programs providing a high definition image of 1250 lines over broadcasting channels having insufficient band-width to covey all pixels of all successive video fields. This situation requires image processing techniques reducing the volume of data to be transmitted. In general, the image processing techniques comprise spatio-temporal subsampling and movement compensation involving the calculation of a motion vector field during the analysis of the image prior to broadcasting, the transmission of assistance data containing the vector field at the time of broadcasting and finally, when decoding in a receiver for displaying a high definition image, the use of the assistance data to reconstruct the image.

One of the problems associated with this method of broadcasting is the simultaneous existence of high definition receivers and of first generation receivers which must both deliver a good quality image. Now, time subsampling, particularly with field skip or frame skip, leads to jerking of the image restored by a first generation receiver which cannot use the assistance data to overcome it.

2. Prior Art

Although the problem is general in nature, reference will be made especially in what follows to the broadcasting of television programs by the HD-MAC system defined by the European project EUREKA EU95. The transmission of a high definition image comprising 1250 lines of 1440 points would require if effected using a multiplex of digital data in base band and a chrominance and luminance analog signal, a bandwidth very much greater than that offered by satellite broadcasting channels. To reduce the flow of data required, use will be made:

for low temporal activity pictures areas, of purely temporal subsampling, spreading the spatial data of one or more source frame analysed over several successive transmissions fields;

for high temporal activity picture areas, of wider space subsampling or non-linear processing of the signal, by motion compensation, which results in not respecting the 50 Hz analysis of the source pictures and implies the use of assistance data transmitted so that the HD decoder can reconstruct the image;

for pictures having a very high time activity (amplitude of the vector greater than the swing of the motion estimation) or for picture areas with so called "erratic" motion, spatial subsampling of each analysis field.

General information regarding HD-MAC may be obtained by reference to publications, particularly "Colloque TVHD 87", Ottawa, Oct. 4–8, 1987, Vol. 1, pp. 6.2.2.–6.2.28, P. Bernard et al: "Analyse de structures de sous-echantillonnage spatio-temporel d'un signal TVHD en vue de sa transmission dans un canal MAC"; publications WO-A-8 705 770(British Broadcasting Corp.) and WO-A-8 801 462 (British Broadcasting Corp.). The contents of such documents are included in the present specification by way of reference.

In what follows, particular attention will be directed to a situation in which the source pictures (or source picture portions) with high temporal activity are broadcast by spreading out over two successive broadcasting fields the alternate lines of the same field (odd video field) of the video source picture. At reception, the contents of the two transmission fields are used for restoring a same odd video field of the high definition frame and the missing video fields (even fields) are restored from the available video fields (uneven fields) and from assistance data transmitted separately and giving an indication concerning the field of motion vectors.

However, a first generation receiver will strictly reproduce, in the form of two successive video fields, two transmission fields corresponding to the same HD scanning field (source picture at a given time), hence jerking of high temporal activity pictures since the analysis rythm will in fact be 25 Hz, i.e. 40 ms.

If it is attempted to substitute for the above subsampling technique, called "field skip", the transmission of one point out of four only of each of the successive frames (i.e. to carry out a wider space subsampling), the picture delivered by the HD-MAC receiver, which has no complete video field any longer, is considerably degraded.

The second transmission field of each pair cannot be formed by points either which are not the points of the source picture, but points offset so as to take into account the motion vector at the source point, for this method faces problems of zones with overlapping or uncovering which no longer respect bijectivity between the points to be transmitted and the actually transmitted points.

SUMMARY OF THE INVENTION

It is an object of the invention to provide a method of broadcasting high definition television programs making it possible to appreciably improve the picture displayed by first generation receivers, without appreciably detrimentally affecting the picture delivered by a high definition receiver.

For that purpose, the invention provides a method of broadcasting high definition television programs over a narrow channel, according to which the source picture analysis signal is subjected to spatio-temporal subsampling and to non-linear motion compensation filtering leading to transmitting the points representative of a same source frame over at least two successive transmission fields and transmitting, along with the frame, assistance data defining a field of motion vectors; in order to improve the compatible picture delivered by a receiver not using the assistance data, each of the transmission fields other than the uneven analysis transmission fields corresponding to a same analysed source field is subjected to a predetermined time attenuation in the direction of the motion of the areas concerned by the spatio-temporal subsampling, said attenuation depending on the contents of the frame and on the respective motion vector and leading to assigning to each point of said areas an intermediate position between its position in the analysed source frame and its anticipated position in the direction of movement.

During high definition reception, the points of the frame field (or fields) corresponding to the even transmission field (or fields) other than the first uneven transmission field are enhanced in time before processing for restoration of the high definition image. On the other hand, a first generation receiver will use the transmitted fields as they are as pictures fields and time attenuation will to a great extent overcome the "movies" effect.

The invention will be better understood from the following description of a particular embodiment, given by way of non-limitative example. The example relates specifically to satellite broadcasting of HD-MAC programs with, among other subsampling operations, spatio-temporal subsampling of the so-called "field skip" type, but this application is in no way exclusive. The invention could be transposed directly to other spatio-temporal subsampling techniques, particularly frame skip, and to transmission systems other than MAC, not using a band base analog multiplex of luminance signals and chroma signals.

The description refers to the accompanying drawings.

BRIEF DESCRIPTION OF THE DRAWINGS

FIG. 2 is a diagram showing the analysis sequence of a fraction of the source picture, transmission and reconstruction of the high definition picture in the case of field skip subsampling;

FIG. 3 shows the method of sampling a source frame in the frame skip technique without using the invention;

FIG. 8, similar to FIG. 7, illustrates a method of selecting attenuation parameters which can be used for implementing the invention;

FIG. 11 is a block diagram showing a general possible construction of a circuit for attenuation in the direction of motion, which can be used for implementing the invention, and implements the selection method illustrated in FIG. 8;

FIGS. 11A and 11B are diagrams showing a possible construction of circuit 34 to 60 of FIG. 11;

FIG. 11C is a table showing the nature of the components shown in FIGS. 11A and 11B, (each component having an output latch);

FIGS. 13 and 14 are tables giving possible values of weighting coefficients used for movement compensation;

FIG. 15 shows an example of transformation caused by use of the invention.

DETAILED DESCRIPTION OF A PREFERRED EMBODIMENT

Before describing the invention with reference of the accompanying drawings, some of the notations will be defined.

The terms analysis fields T1 and T2 will designate the odd and even analysis fields of a source frame the even field lines being interlaced with the odd field lines; the only signals which are transmitted define points situated in the odd fields when the spatio-temporal subsampling takes place by field skip.

By i.e. a frame "compatible frame" compatible with a first generation receiver is meant the frame which this receiver delivers when it is supplied, through a transmission channel, with a broadcast coded by a high definition encoder with spatio-temporal compression (by field skip in the particular case which will alone be considered hereafter).

The terms transmission fields t1 and t2 will designate the successive odd and even transmission fields; the terms "point A to be transmitted", will designate a point of the source frame belonging to the high definition analysis field T1 to be transmitted and which due to field skip, is not transmitted in a field t1 but in a field t2 (this definition being possibly generalized and in particular applied to the case of frame skip, in which case four transmission fields correspond to the same analysis field or frame) ; and the terms "transmission point" will designate a point in phase in space and in time with that the point C which is actually transmitted in a field t2.

Figure 1:
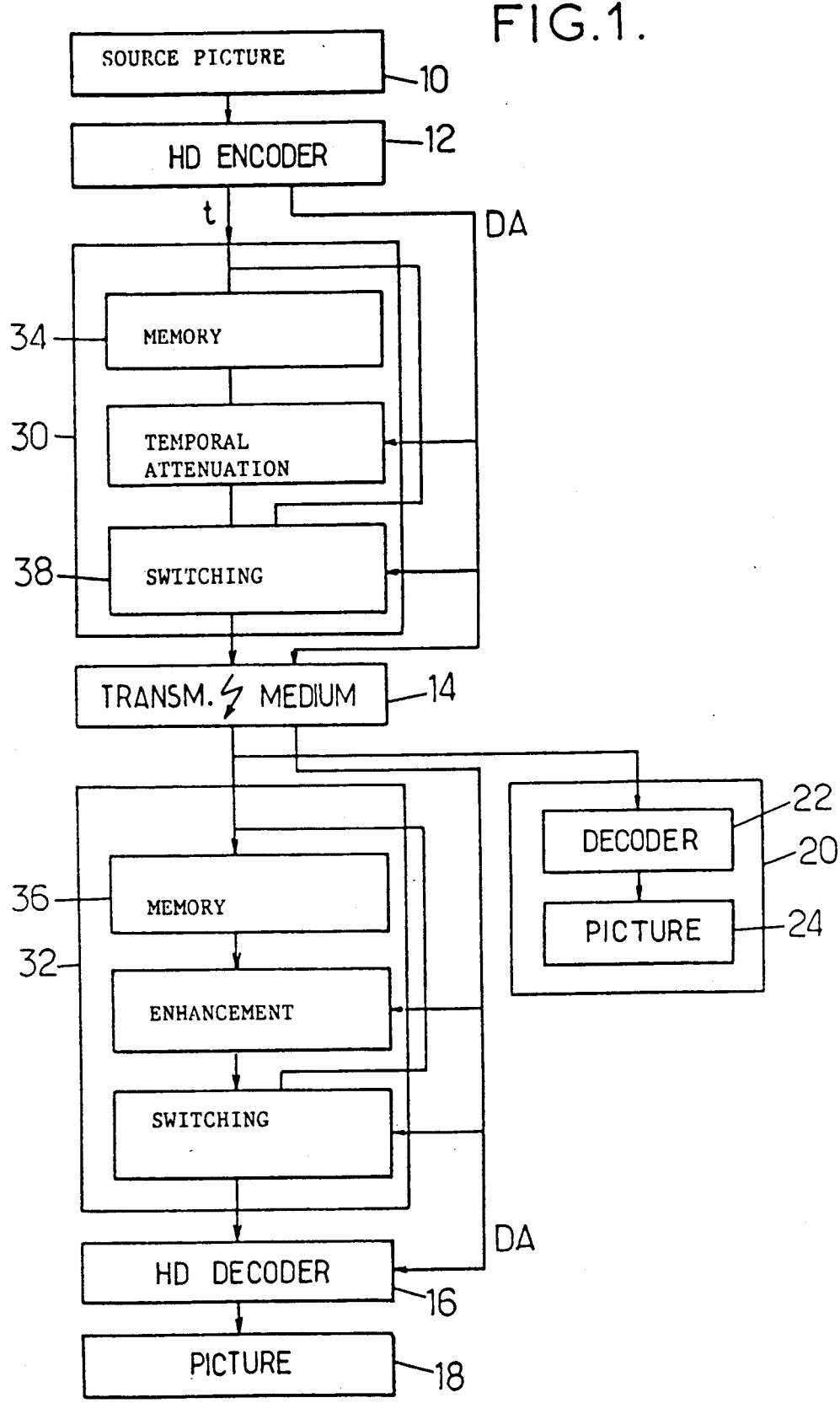
FIG. 1 is a general diagram showing the set of steps involved in the processing of the video signal (luminance or chrominance) from analysis of the source up to reconstruction as a high definition picture or as a compatible picture in a first-generation receiver.

FIG. 1 is a general block diagram of a process for broadcasting a high definition frame. The source frame 10 is analysed and subjected to high definition encoding at 12. This encoding employs, over one channel at least, spatio-temporal compression techniques which give rise, on one hand, to two transmission fields t1 and t2 for each odd field T1, and, on the other hand, to assistance data DA, identifying in particular a field of motion vectors. Without use of the invention, the assistance data DA and the fields t1 and t2 are transmitted directly over a transmission support 14. Each high definition receiver carries out high definition decoding at 16 and delivers a picture 18 with 1250 lines of 1440 points on a screen.

However, in a first generation receiver 20, the transmitted fields are directly decoded at 22 without using the assistance data and deliver a compatible frame 24 having 625 lines, in which points corresponding to the source frame at the same time, analyzed at a frequency of 25 Hz, are distributed into two successive video fields having a time offset of 20 ms.

At the present time, it has been decided to carry out HD (high definition) encoding at 12 with adaptation to the temporal activity of the picture.

In the case of non-zero temporal activity, a simple spatio-temporal subsampling of a source frame is carried out and the frame is distributed over several fields (two fields in the case of field skip), which leads to transmitting, over two transmission fields t1 and t2, informations of the source frame in the same time "plane", corresponding to a single field T1, the fields T1 being repeated at a rate of 25 Hz.

In an HD receiver, reconstruction of the even video fields is made from the odd video fields, completely preserved by the transmission, using the field of motion vectors transmitted in the assistance data. But first generation receivers, providing a compatible frame, do not use the assistance data and consequently picture jerking can be seen, visible particularly at the borders between the moving picture areas and the background.

FIGS. 2 and 3 show schematically how analysis, transmission and reconstruction take place. During analysis, only the points e and e' are selected, among the points of the set of points forming the high definition frame (e+e'+,), distributed between the analysis and restoration fields T1 and T2 which also form the video HD restoration fields. The direction of the lines is horizontal in the Figures. As shown by the arrows from the "analysis" portion to the "transmission" portion of FIG. 2, the points e and e' selected during the analysis of a frame at a given time are distributed over two successive transmission fields t1 and t2, sent with a shift of 20 ms in the case of a 50 Hz scanning frequency. The high definition frame is reconstructed in a high definition receiver by motion compensation. Sampling of the frame is as shown in FIG. 3, the commas designating points which are not transmitted.

During reconstruction of the high definition frame, all the available points from the transmission fields t1 and t2 are re-incorporated in the uneven fields T1.

The fields T2 are rebuilt using the field of motion vectors V which allows the value of the points o of the even fields to be determined from values at the transmitted points e and e', possibly from the reconstructed points x and from the velocity vectors.

Such reconstruction, essential in order to obtain a high quality picture, requires availability of the set of points e and e' and requires that they are not affected by excessive noise.

Figures 4, 5, 6:
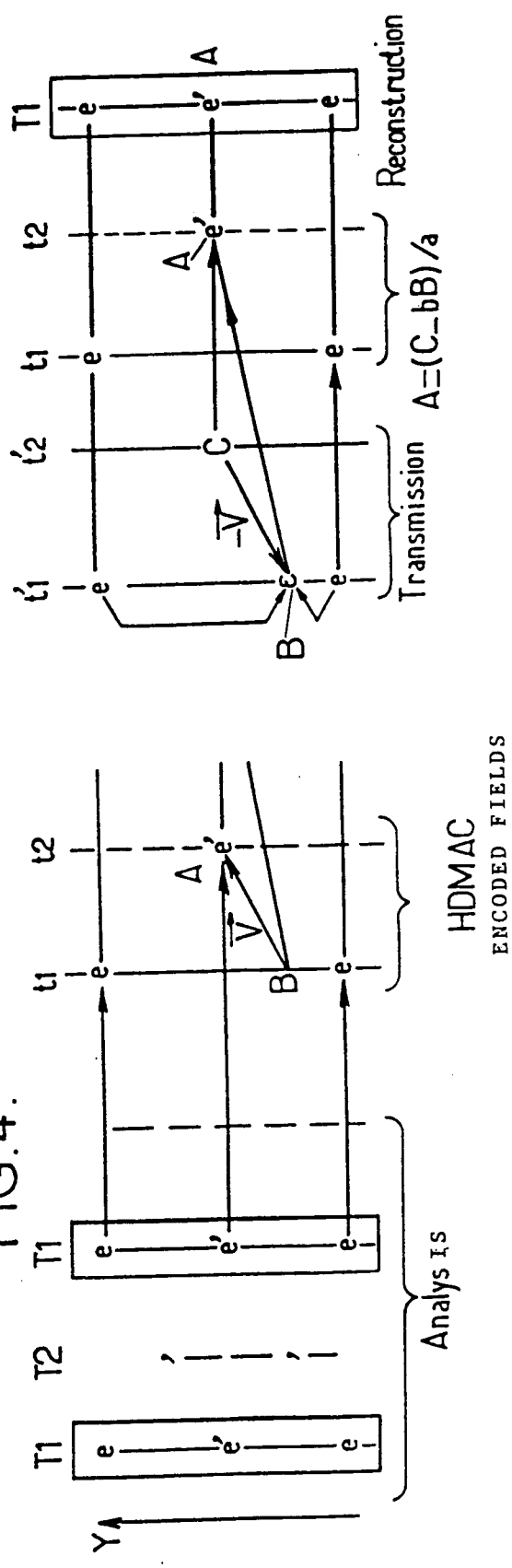
FIGS. 4 and 5 are diagrams showing determination of the transmitted points, respectively using a method providing motion compensation for the compatible frame and in accordance with the invention.
FIG. 6 shows reconstruction of a picture point of the high definition odd field, from transmitted fields of the type shown in FIG. 5.

Now, if it were desired to improve the compatible picture (whose video fields reproduce purely and simply the transmission fields t1 and t2 shown in FIG. 2), it would be necessary to take into account the motion vector and to give to points e' of the even transmission fields values which might be very different from those permitting reconstruction by the HD decoder. That would amount to substituting, for a point e' transmitted over an even transmission field in FIG. 2, a point having a value x which is that of a virtual point in field T1, forming the reverse projection in the direction of motion of the transmission point C (FIG. 4). But the information would thus be lost concerning the actual point to be transmitted A, required for reconstructing the HD image, which is not acceptable.

So as to preserve information required for reconstructing the high definition image and at the same time avoid excess degradation of the compatible frame, the invention:

keeps in unaltered form those points of the odd analysis field T1 which are transmitted over the transmission field t1, effects, on those points of the odd analysis field T1 which are transmitted over the even transmission field t2, weighted averaging of the values (luminance or chrominance) of the point of field T1 to be transmitted over t2 and of the virtual point, obtained by inverse projection of the point transmitted over field t2 in accordance with the motion vector estimated at this transmission point, the virtual point or impact point being computed from points transmitted over the odd transmission field t1.

This operation amounts to an attenuation in the direction of movement.

The principle of the invention may be understood from the diagrams of FIGS. 5 and 6: in FIG. 5, the points of the analysis field T1 are designated e and e'. The analysis field (source field ) T1 and the result of the HD-MAC coding, namely fields t1 and t2, have been shown. There has also been shown the result of the method of the invention which operates on the fields t1 and t2 and delivers two new fields t'1 and t'2. t'1 is identical to t1, but t'2 is different from t2. B designates the inverse projection of the transmitted point x in the direction of motion, which will be called hereafter "impact point" of the motion vector. A good followup of the movement would lead to transmitting the virtual point B rather than the point x derived from point A of the respective odd field T1. But then the transmitted point would no longer contain any information about the point to be transmitted. To conserve it, in accordance with the invention, the transmitted point C is generated by weighted average between the point A of the field to be transmitted and the virtual point B, i.e. the impact point, as shown schematically in FIGS. 5 and 15.

The high definition decoder provides an accentuation or enhancement which restores the initial information, such as it existed before attenuation: the point to be transmitted from the transmitted point and from the estimated motion vector at this point, computed in the encoder and transmitted to the decoder in the assistance data is recovered. Such restoration calculation is shown schematically in FIG. 6.

Figure 10:
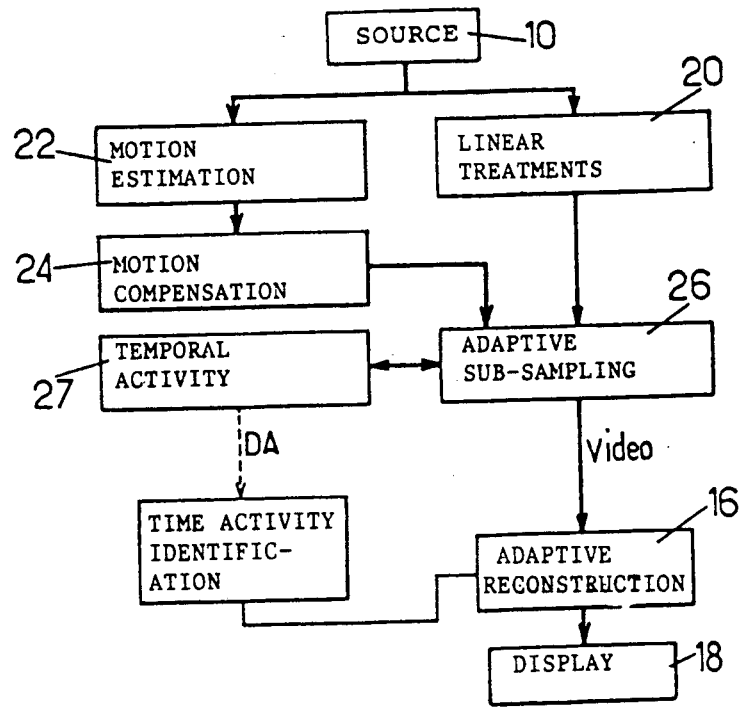
FIG. 10 is a general diagram of an HD-MAC coder which can be used in the apparatus shown in FIG. 1.

The functional diagram of the encoding and decoding chains may then be as shown in FIG. 10 (where the steps corresponding to the components identified in FIG. 1 bear the same reference number). Referring to FIG. 10, in which only the HD encoding and decoding diagram has been shown, the analyzed picture is subjected to linear pre-filtering processing at 20, corresponding to the different processing channels. At the same time, the frame is subjected to motion estimation at 22 and to the non-linear motion compensation processing operation at 24. An adaptive sub-sampling block 26 determines subsequently, by comparison of the frames delivered by the different channels which are connected thereto, with the original frame, which one of the outputs should be transmitted. At the same time, a block generates data concerning the spatio-temporal activity and incorporates, in the assistance data DA, the value of the motion vectors required for reconstruction as well as switching data identifying which type of processing was selected.

The receiver therefore receives not only the transmission fields, but also switching data indicating which processing channel has been used on encoding as well as the value of the motion vector at each point processed depending on the channel subjected to compensation.

The estimation of the motion vector V is not concerned by the present invention and so will not be described. But, with reference to FIGS. 7 and 8, the mode of transmitting this motion vector V will be indicated.

Figure 7:
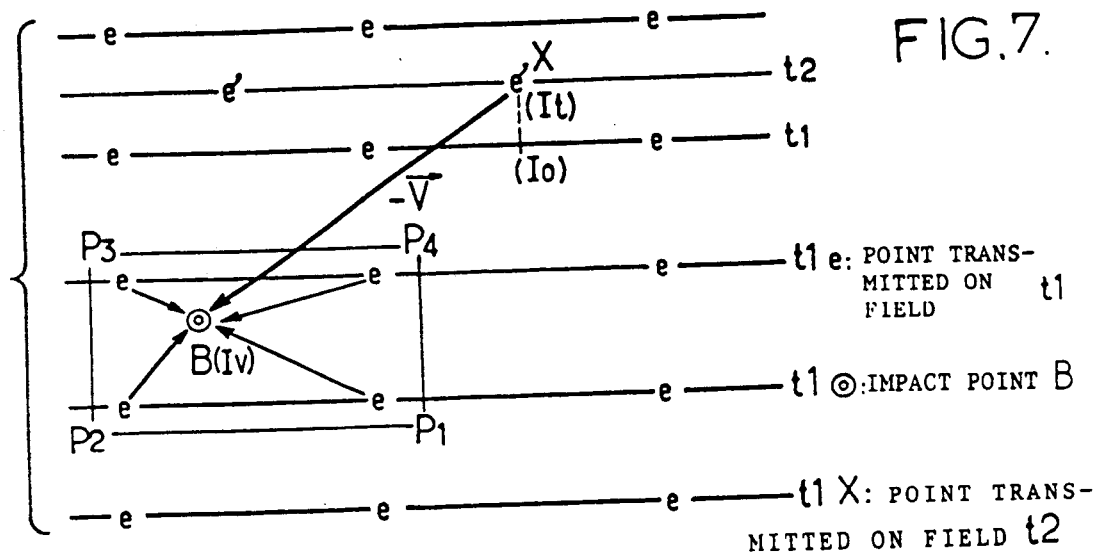
FIG. 7 shows a possible method of interpolation applicable to the method of analysis of FIG. 6 for providing attenuation in the direction of motion.

For that, the following notations will be used, some of which are used in FIG. 7. The following will designate:

$I_o(x,y,t)$: the initial value of the luminance or chrominance at a point of the source frame of coordinates (x,y), at time t of the analysis;

$I_t(x,y,t)$: the transmitted value, after attenuation, for point (x,y) and at time t, $I_r(x,y,t)$: the value after enhancement, for point (x,y) and at time t, $I_v(x,y,t-T)$: the value at the point (impact point) projected in the direction reverse of that of an estimated motion vector V, for the point (x,y,t) such as transmitted on field t2, Vx: the value in direction x (line direction) of the motion vector V, estimated on an HD frame at the transmitted point, Vy: the value in direction y of the motion vector V, estimated at the transmitted point.

Figure 9:
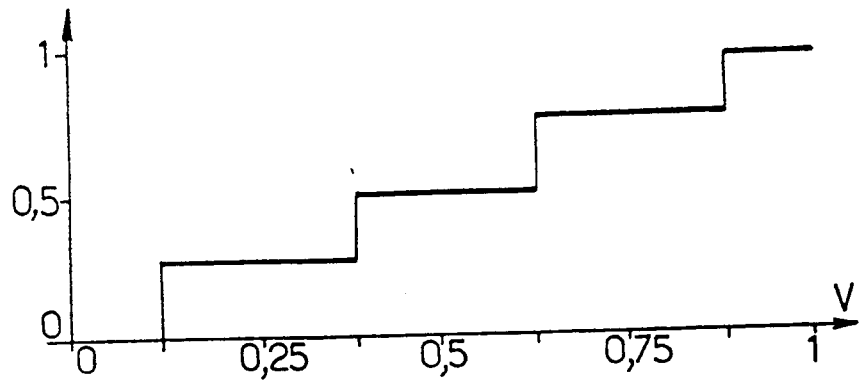
FIG. 9 shows a possible method of quantizing the fractional parts of the motion vectors before use for the analysis method shown in FIG. 7.

In the case illustrated in FIG. 7, bilinear interpolation is carried out using the four points e of the transmission field t1 surrounding the impact point B of the motion vector, designated as P1, P2, P3, P4. The motion vector V itself is advantageously quantified over a small number of values if it is not already a whole number (four in the case shown in FIG. 9) for simplifying the computation. The procedure is as follows: first of all, the four points P1, P2, P3 and P4 closest to the impact point B are determined by computing the non-fractional parts of all values of the motions in directions x and y related to the values Vx and Vy of the motion. The four neighbouring points belong to the field t1 transmitted without preprocessing, so that the same computation may be carried out in the decoder. The positions of the selected points vary at the frame period in accordance with horizontal sampling of one point out of two. The bilinear interpolation is carried out by two linear interpolations along x and y, then by the product of the two interpolations, as will appear later with reference to FIGS. 11 and 12.

A simpler, but less advantageous, solution would consist in "forcing" point B into that of points P1, P2, P3 and P4 which is closest.

Once point B has been determined, attenuation in the direction of movement should be carried out. Attenuation is provided by a weighted average computation between the point to be transmitted A and point B. In the case of field skip, the only one considered here, the transmitted fields of odd parity t1 are unchanged. The transmitted fields of even parity t2 are subjected to attenuation which may be in accordance with the following formula giving the transmitted value $I_t$:

$$I_t(x,y,t) = a\, I_o(x,y,t-T) + (1-a) I_1. V(x,y,t-T)$$

where T designates the transmission field period, i.e. 20 ms in the case of the European standard, and a is a coefficient less than unity. It may be arbitrarily considered that a=1 for odd transmission fields.

It remains to select the value assigned to a for the even transmission fields. The value of a has a direct influence on the noise which affects the recovered high definition picture. In fact, accentuation (enhancement) results in an intensity $I_r$:

$$I_r(x,y,t-T) = [I_t(x,y,t) - (1-a)I_1. V(x,y,t-T)]/a$$

The term a appears in the denominator and a high value of a gives then a high importance to the noise appearing in the numerator.

It is consequently of advantage to select a value of a which is not fixed once for all but depends:

on the amplitude of the motion vector, since the jerk is all the more troublesome on the compatible image the higher the value of the motion vector, on the contents of the image, for the jerks are only troublesome when the information to be transmitted changes from field to field, i.e. at the points which represent borders.

Adaptive attenuation may be used in response to the amplitude of the motion vector and on the contents of the frame, and the following adaptation law of the coefficient a may typically be used.

For applying this law, a parameter VM representative of the motion is defined as:

$$VM = /Vx/ + /Vy/$$

where
Vx is the whole part of $V_o x$
Vy is the whole part of $V_o y$ and a coefficient is adopted as shown in Table I:

TABLE I

| | |
|---|---|
| $0 \leq VM < 1$ | $a = 1$ |
| $1 \leq VM < 3$ | $a = \frac{3}{4}$ |
| $3 \leq VM < 5$ | $a = 3/5$ |
| $5 \leq VM$ | a variable |

More completely, the law is as follows:

weighting coefficient a of the "current" point A equal to zero for small movements, for example less, in the strict sense, than 1 high definition pixel per field, weighting coefficient a equal to $\frac{3}{4}$ for small movements (1 to 2 pixels per HD field), weighting coefficient a equal to 3/5 for the movements comprised between 3 and 4 pixels, beyond 5 pixels per field, weighting coefficient variable between 3/5 and 98/256, depending on the difference between the intensities at the actual point and the virtual point.

Table II below gives a possible rule for selecting the weighting coefficient, starting from two base thresholds S1 and S2 which in their turn define five thresholds for selection of a as a function of the difference of intensities $V_M$, when it is at least equal to 5. Depending on the value of $\delta = |BH-D|$, where BH is the result of filtering with weighting coefficients 1-2-1 on B, in the horizontal direction:

TABLE II

| δ | a | th |
|---|---|---|
| $0 \leq . < th1 = S1$ | 3/5. | th1 = 25 |
| $th1 \leq . < th2 = S1 + (S2-S1)/4$ | 140/256. | th2 = 29 |
| $th2 \leq . < th3 = S1 + (S2-S1)/2$ | 128/256. | th3 = 33 |
| $th3 \leq . < th4 = S1 + (S2-S1)*\frac{3}{4}$ | 117/256. | th4 = 37 |
| $th4 \leq . < th5 = S2$ | 107/256. | th5 = 41 |
| $th5 \leq .$ | 98/256 | |

In the example given, S1 and S2 are respectively equal to 25 and 41.

Such a law only allows a high weighting coefficient, equal to 98/256, to be adopted when the point C to be transmitted is appreciably different from the corresponding virtual point B.

The amounts of attenuation given above are in no way limitative. In practice, instead of $\frac{3}{4}$, a value may be chosen between 1 and 3/5; instead of 3/5, a value between $\frac{3}{4}$ and $\frac{1}{2}$; and, instead of 98/256, another value between $\frac{1}{2}$ and $\frac{1}{4}$.

FIG. 8 shows how switching between the different possible values of the attenuation coefficient a may be controlled responsive to evaluation of V. In FIG. 8, the points to be compared are, on the one hand, a pseudo-point D which results from an average of four points e (designated as D1, D2, D3 and D4) of the transmission field t1, surrounding the point to be transmitted and, on the other hand, the respective virtual point B. Point D is obtained by taking the weighted average of the four points e of field t1 which surrounds the point to be transmitted, designated by D1, D2, D3 and D4.

Since the transmission noise may, at reception, lead to erratic indications, the value of B on a single odd field, may be replaced, for the comparison, with a weighted average over several successive points B, for example over three successive points along the horizontal, with weighting coefficients equal to 0.5 for the current point, 0.25 for the preceding and following points.

Simpler or more complex solutions than that which has just been described are also possible. In particular, the weighting coefficients may be switched solely responsive to the value of the velocity vector, with, as a drawback, an increase in noise affecting the high definition frames having a high degree of motion.

Referring again to FIG. 1, the high definition encoder 12 is followed by an attenuation and switching block 30, whereas, symmetrically, the decoder 16 of the receiver is preceded by an accentuation and switching block 32. The switching block mixes the processed and unprocessed fields, responsive to the assistance data, in accordance with a general scheme which may be that of FIG. 10. Symmetrically, the assistance data determines whether, in the case of a reconstructed frame, there has been attenuation or not. In the case of attenuation at transmission, there is switching to the accentuation channel before application to the decoder 16.

The attenuation and switching block 30 must comprise an input field memory 34, due to the time delay between the even parity transmission fields t2 and the odd parity transmission fields t1. Similarly, a field memory 36 is necessary in the accentuation and switching block 32. But in practice, most of the existing decoders comprise a memory having a sufficient capacity for storing a field, so that no additional component of large size is necessary.

Figure 11B:
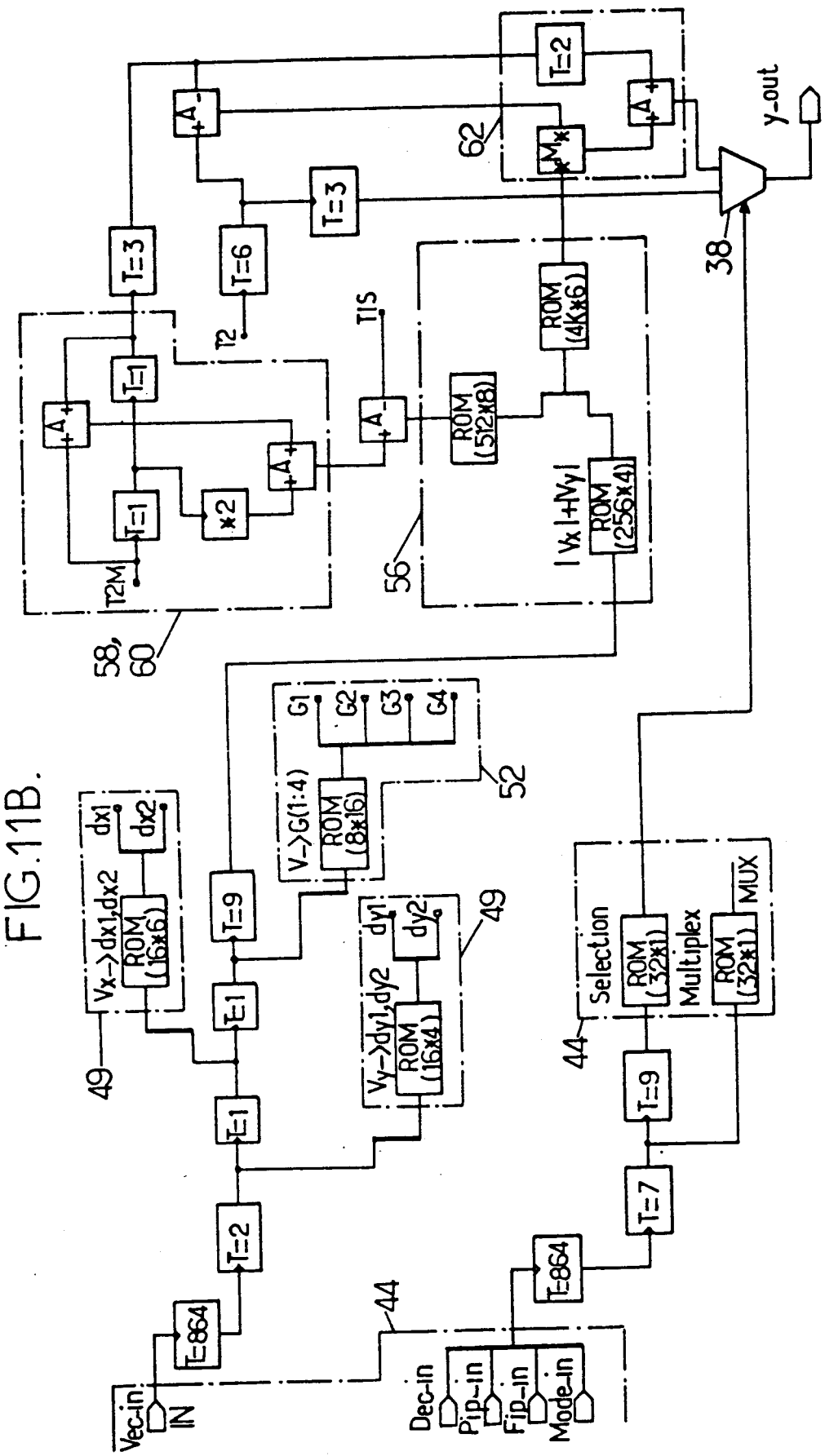

FIG. 11 shows the operations carried out by the accentuation and switching block 30. The output I(X,t) of decoder 12 is applied directly to the output switch 38 of the block and to the video memory 34, having a capacity corresponding to a whole video field. The purpose of this memory is to store at one and the same time all the points forming an odd field. The memory is therefor loaded every 50th of a second. The memory typically has a capacity of one complete field plus a few lines which function as a sliding memory. The need for a random access memory is thus avoided. The memory is provided with four simultaneous read-out ports, for loading an intermediate computation memory 40 with the four points for computing the impact point B, as shown in FIG. 7: thus a sliding window is formed. Since the amplitude of the motion vector V is very variable, it will often be necessary to have access to points of the fields which are located on lines different from those of the current frame, resulting in a need that the video memory correspond to one complete field and give multiple accesses at any point of the field.

The video memory 34 is addressed by a computing circuit 49 which delivers the address of the four points to be stored in memory 40. The computing circuit receives, on the one hand, the value X on the current line and, on the other hand, the two components $V_ox$ and $V_oy$ of the velocity vector.

These components are formed from the assistance data DA, taking into account the fact that the structure transmitted pattern will be a quincunx field structure having twice less points and twice less lines than according to the start analysis. Since the interpolation of the impact point must be made solely from points which will be transmitted over the transition fields t1, only one line out of four and one point out of two are available for interpolation. And finally, the point to be corrected on each field t2 is phase shifted by the interval between two high definition points and by the interval between two high definition lines with respect to the points transmitted over the respective field t1.

The circuits of FIG. 11 comprise means for processing the motion vectors, contained in the assistance data 44, for taking up the phase shift and standardizing the components of the motion vector so as to determine the adjacent points P1, P2, P3 and P4 (FIG. 8).

A first operation carried out by circuit 44 consists in taking up the phase shift of a point on one line, and two lines on field t1.

The vectors vx and vy corrected from the phase shift point of view are obtained, from the vectors $v_ox$ and $v_oy$ estimated at point X(x,y) at time t according to the formula:

$$vx = v_ox - 1$$

$$vy = v_oy + 2$$

The next step consists in standardizing the vectors by the operation:

$$vx/2 \longrightarrow vx$$
$$vy/4 \longrightarrow vy$$
(as a whole)

From that, the points P1, P2, P3 and P4 neighbouring the impact point B must be calculated.

If the following conventions are adopted:

$u = +1$ if $vx$ is positive $u = -1$ if $vx$ is negative $v = +1$ if $vy$ is positive $v = -1$ if $vy$ is negative the four points neighbouring the impact point will then be:

$$P3 = (x - vx, y - vy) = (x + dx1, y + dy2)$$
$$P1 = (x - vx, y - v - vy) = (x + dx1, y + dy1)$$
$$P2 = (x - u - vx, y - v - vy) = (x + dx2, y + dy1)$$
$$P4 = (x - u - vx, y - vy) = (x + dx2, y + dy2).$$

P1, P2, P3 and P4 are obtained by reading out a stored look up table, such as that of Table III below:

TABLE III

| Vx | dx1 | dx2 | Vy | dy1 | dy2 |
|---|---|---|---|---|---|
| −6 | −3 | −4 | −6 | −2 | not used |
| −5 | −2 | −3 | −5 | −1 | −2 |
| −4 | −2 | −3 | −4 | −1 | −2 |
| −3 | −1 | −2 | −3 | −1 | −2 |
| −2 | −1 | −2 | −2 | −1 | −2 |
| −1 | 0 | −1 | −1 | 0 | −1 |
| 0 | 0 | −1 | 0 | 0 | −1 |
| 1 | 1 | 0 | 1 | 0 | −1 |
| 2 | 1 | 0 | 2 | 0 | −1 |

TABLE III-continued

| Vx | dx1 | dx2 | Vy | dy1 | dy2 |
|---|---|---|---|---|---|
| 3 | 2 | 1 | 3 | 1 | 0 |
| 4 | 2 | 1 | 4 | 1 | 0 |
| 5 | 3 | 2 | 5 | 1 | 0 |
| 6 | 2 | 2 | 6 | 1 | 0 | where
(x,y) are the coordinates of a current point
$dx1 = (Vx+1)/2$; $dx2 = (Vx-1)/2$
$dy1 = (Vy+1)/4$; $dy2 = (Vy-3)/4$
Vx is the whole part of $V_o x$
Vy is the whole part of $V_o y$.

The positions of the four corresponding points appear at the output of circuit 49, which also receives X(x,y). The bilinear interpolation coefficients a (FIG. 7) are selected from the different predetermined values. Selection is made starting from Vx and Vy in accordance with tables which may be those of FIGS. 13 and 14. In FIGS. 13 and 14, G1, G2, G3 and G4 designate the four coefficients of the bilinear interpolation making it possible to obtain B by the formula $B = G1 \cdot P1 + G2 \cdot P2 + G3 \cdot P3 + G4 \cdot P4$; Vx and Vy are again the whole values of $v_o x$ and $v_o y$. The coefficients appear at the output of 52.

The selection may however be omitted, by always giving the same values to the weighting coefficients.

The selection may take into consideration, rather than the velocity vector corresponding to point B of a single field, a point obtained by weighting over a plurality of successive points B, as mentioned above. As shown in FIG. 11, the data stored at 58 corresponding to two prior points and those corresponding to the current point are used so as to form a weighted average at 60, with coefficients equal to 1, 2 and 1.

The purpose of the bilinear interpolation module 54 is to deliver a value J(X,t−1) representative of point B (FIG. 7) from the four neighbouring points delivered by circuit 40 and the quantified values G1, G2, G3, G4. The values of the four points P1, P2, P3 and P4 are written:

$I(P3,t-1)$, $I(P1,t-1)$, $I(P2,t-1)$, $I(P4,t-1)$

The result at the output of the module is:

$J(X,t-1) = G1 \times I(P1,t-1) + G2 \times I(P2,t-1) + G3 \times I(P3,t-1) + G4 \times I(P4,t-1)$.

The output of module 54 drives an adaptive weighting module 62 which delivers the value of point C to be transmitted (FIG. 5). Module 56 receives the video signal I(X,t) and the signal leaving the adaptive interpolation module J(X,t−1) and delivers a signal:

$K(X,t) = a\ I(X,t) + (1-a)\ J(X,t-1)$.

The adaptive switching module 34 receives both the unprocessed signal I(X,t) and the signal K(X,t−1) coming from the adaptive weighting module 62. Switching is controlled by a mode information available from the assistance data signal DA. For a field t2 to be transmitted, if the processing mode of the encoder corresponds to a motion compensation branch, then:

$L(X,t) = K(X,t)$

If the mode used at the computed point is any other, then:

$L(X,t) = I(X,t)$

The switching and accentuation block 32 associated to decoder 16 will comprise modules of the same kind as those shown in FIG. 11, except for those contained in broken line frame which are typically incorporated in the decoder. But the computed weighting coefficient must be reversed.

The different modules described above have a very simple construction and operation. The general construction and the sequential operation of some of them will now be described, using again the notations X(x,y) for designating a point of abscissa x along line y.

The video memory 34 operates alternatively in readout mode and write-in mode. During loading, the value of the origin current point X(x,y,t−T) of field T1 is stored in the field memory MI (t−1) and is directed towards the output. During read-out, the values of the four points P1, at t−T
P2, at t−T
P3, at t−T
P4, at t−T whose address is supplied by neighbouring computation module 49 are applied to the bilinear interpolation module 54.

Figure 12:
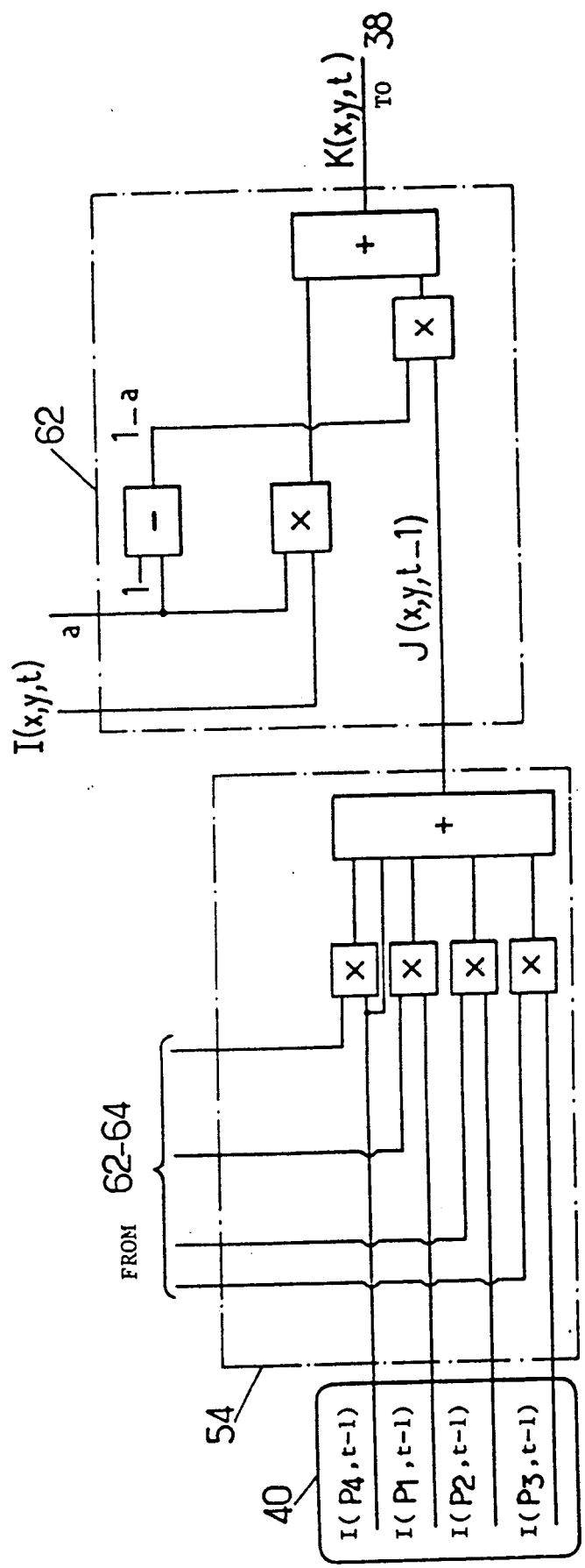
FIG. 12 is a possible construction of some of the modules of FIG. 11.

Modules 54 and 62 may be as shown in FIG. 12, which need not be described due to its obvious nature.

Thus there is transformation from fields t1 and t2 coming from the encoder to transmission fields t'1 and t'2, as shown by way of example in FIG. 15.

I claim:

1. A method of broadcasting high definition television programs over a channel having a narrow bandwidth, comprising: subjecting a signal resulting from analysis of a source picture to spatio-temporal subsampling and to non-linear movement compensation filtering, and transmitting the points representing a same picture frame as signals over at least two successive transmission fields (t1, t2); and transmitting, along with said signals, assistance data (DA) defining a field of motion vectors,
   further comprising, for improving a compatible picture displayed by a receiver devoid of means for the assistance data, subjecting each of the transmission fields other than the first transmission field (t1) corresponding to a same analyzed source frame to a predetermined time attenuation in the direction of motion of picture areas having a high time activity so as to give rise to a modified transmission field (t'2), the degree of said attenuation being selected responsive to the respective motion vector and leading to assigning, to each point of said areas, a position intermediate between its position in the analyzed source frame and its position anticipated in the direction of motion.

2. Method according to claim 1, wherein, during high definition reception, the points of the frame field corresponding to the transmission field other than the first field are subjected to temporal enhancement before they are processed for reconstructing a high definition frame.

3. Method according to claim 1, wherein, during reception by a receiver delivering a compatible image, the transmitted fields (t1, t2) are used in unmodified form.

4. Method according to any one of claims 1, wherein said anticipated position is determined by bilinear interpolation between the four points of the transmission field (t1=t'1) surrounding the impact point of the respective motion vector for determining the anticipated position from the position in the an odd field (t1).

5. Method according to claim 1, wherein each of the points (C) transmitted over the second modified transmission field (t'2) is given a value $I_t$ derived from a value $I_0$ of the same point in the same transmission field (t2) and from the value $I_v$ of the point at the anticipated position by the formula:

$$I_t = a I_o + (1-a) I_v$$

a being a fixed or adaptive coefficient having a minimum value of ½ and in that the point of the restored HD frame is given the value $I_r$:

$$I_r = [I_t - (1-a) I_v]/a.$$

6. Method according to claim 5, wherein the coefficient a is determined as a function of the amplitude of the motion vector and of the contents of the frame.

7. Method according to claim 6, wherein the coefficient a is determined by binary selection between the value 1, a value between 1 and 3/5, a value between ¾ and 12 and values between ½ and ⅜ (maximum value) and ¾ and ½ (minimum value) and the last value is determined by comparing the difference of intensity between the projected point, result of an average, and the virtual corresponding point of the odd transmission field (t'1=t1) in phase with the transmitted point.

8. Method according to claim 6, wherein a is taken equal to: 1 for zero movements, to 3/5 for movements less than 2 high definition pixels per field; to 3/5 for movements between 3 and 4 pixels per field; and, when the movements are greater than 5 pixels per field, to values between 3/5 and 98/256, and depending on the difference between the values of the impact point of the motion vector and the virtual point and on five given thresholds defined from two basic thresholds (S1, S2).

9. Apparatus for broadcasting compatible high definition television programs comprising a transmitter having an HD encoder and at least one receiver comprising an HD decoder, wherein:

said HD encoder is constructed for subjecting the source frame analysis signal to spatio-temporal subsampling and to non-linear movement compensation filtering, leading to transmitting the points representative of the same source frame over at least two successive transmission fields and in transmitting at the same time as the frame assistance data defining a movement vector field and having means for subjecting each of the analysis fields, other than the first transmission field, to a predetermined time attenuation in the direction of movement of the parts with high time activity, said attenuation depending on the corresponding movement vector and leading to assigning to each point of said parts an intermediate position between its corresponding position in the analyzed high definition source frame and its anticipated position in the direction of movement, and the decoder for reconstructing the HD frame is preceded by means for time enhancing the points of the frame field corresponding to the transmission field other than the first one.

* * * * *